(12) United States Patent
Shu et al.

(10) Patent No.: US 12,020,425 B2
(45) Date of Patent: Jun. 25, 2024

(54) FAST ANOMALY DETECTION METHOD AND SYSTEM BASED ON CONTRASTIVE REPRESENTATION DISTILLATION

(71) Applicant: CONTEMPORARY AMPEREX TECHNOLOGY CO., LIMITED, Ningde (CN)

(72) Inventors: Annan Shu, Ningde (CN); Can Chen, Ningde (CN); Jv Huang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/356,229

(22) Filed: Jul. 21, 2023

(65) Prior Publication Data
US 2023/0368372 A1 Nov. 16, 2023

Related U.S. Application Data

(63) Continuation of application No. PCT/CN2021/135278, filed on Dec. 3, 2021.

(51) Int. Cl.
*G06T 7/00* (2017.01)
(52) U.S. Cl.
CPC .... *G06T 7/001* (2013.01); *G06T 2207/20084* (2013.01); *G06T 2207/20224* (2013.01)
(58) Field of Classification Search
CPC .......... G06N 3/08; G06N 3/045; G06N 3/088; G06N 3/082; G06N 20/00; G06N 3/04;
(Continued)

(56) References Cited

U.S. PATENT DOCUMENTS

| 2020/0134506 A1* | 4/2020 | Wang | G06N 3/088 |
| 2020/0302295 A1* | 9/2020 | Tung | G06N 3/045 |

(Continued)

FOREIGN PATENT DOCUMENTS

| CN | 108764462 A | 11/2018 |
| CN | 112801298 A | 5/2021 |

(Continued)

OTHER PUBLICATIONS

International search report received in the corresponding international application PCT/CN2022/135278, mailed Jun. 28, 2022.
(Continued)

*Primary Examiner* — Quan M Hua
(74) *Attorney, Agent, or Firm* — Kilpatrick Townsend & Stockton LLP

(57) ABSTRACT

Provided are a method and system for anomaly detection. The method includes: acquiring a picture of an object to be detected; inputting the acquired picture to each of a trained teacher network and a student network distilled from the teacher network, to obtain a feature map output by the teacher network and a feature map output by the student network, where the teacher network is trained by constructing a defective sample to learn feature distribution of normal samples from a pre-trained expert network; and determining a greatest anomalous pixel in a difference map between the feature map output by the teacher network and the feature map output by the student network as an anomaly value of the acquired picture, to output an anomaly detection result.

13 Claims, 4 Drawing Sheets

(58) Field of Classification Search
CPC .......... G06N 3/084; G06N 5/02; G06N 5/022; G06N 3/048; G06T 2207/20081; G06T 2207/20084; G06T 2207/10004; G06T 2207/30108; G06T 7/0004; G06T 7/0006; G06T 2207/20016; G06T 2207/20132; G06T 7/001; G06T 2207/10024; G06T 2207/10081; G06T 2207/20221; G06T 2207/30061; G06T 2207/30096; G06T 2207/30164; G06T 5/009; G06T 7/0002; G06T 7/10; G06T 7/11; G06T 7/60; G06V 10/774; G06V 10/82; G06V 10/761; G06V 20/10; G06V 10/25; G06V 10/764; G06V 10/765; G01N 2021/8874; G01N 2021/8887; G01N 21/8806; G01N 21/8851

See application file for complete search history.

(56) References Cited

U.S. PATENT DOCUMENTS

| | | | | |
|---|---|---|---|---|
| 2022/0036194 | A1* | 2/2022 | Sundaresan | G06N 3/063 |
| 2022/0067274 | A1* | 3/2022 | Wang | G06N 3/08 |

FOREIGN PATENT DOCUMENTS

| | | | | |
|---|---|---|---|---|
| CN | 112991330 | A | * | 6/2021 |
| CN | 112991330 | A | | 6/2021 |
| CN | 113326941 | A | | 8/2021 |
| WO | WO-2022130814 | A1 | * | 6/2022 |

OTHER PUBLICATIONS

Written opinion received in the corresponding international application PCT/CN2022/135278, mailed Jun. 28, 2022.
The extended European search report received in the corresponding European application 21960115.0, mailed Jan. 16, 2024.
Guodong Wang et al: "Student-Teacher Feature Pyramid Matching for Anomaly Detection", Arxiv, Org, Cornell University Library, 201 Olin Library Cornell University Ithaca, NY 14853, Oct. 28, 2021(Oct. 28, 2021).
Tian Yonglong et al:"Contrastive Representation Distillation", arXiv (Cornell University), Jan. 18, 2020 (Jan. 18, 2020), pp. 1-19.
Chaoyi Yang et al: "Knowledge Distillation with Contrastive Inter-lass Relationship", Journal of Physics: Conference Series Institute of Physics Publishing, Bristol, CB, vol. 1756, No. 1, Feb. 6, 2021 (Feb. 6, 2021), pp. 12001.
Salehi Mohammadreza et al "Multiresolution Knowledge distillation for Anomaly Detection", 2021 IEEE/CVF Conference on Computer Vision and Pattern Recognition (CVPR), IEEE, Jun. 20, 2021(Jun. 20, 2021), pp. 14897-14907.
Yao Xincheng et al: "Multi-Scale Feature Distillation for Anomaly Detection", 2021 27th International Conference on Mechatronics and Machine Vision in Practice (M2VIP), IEEE, Nov. 26, 2021 (Nov. 26, 2021), pp. 486-491.
Jianping Guo et al: "Knowledge Distillation A Survey", arxiv.org, Cornell University Ithaca, NY 14853, May 20, 2021(May 20, 2021).
Pang Guansong et al: "Deep Learning for Anomaly Detection", ACM Computing Surveys, ACM, New, York, NY, US, US, vol. 54, No. 2, Mar. 5, 2021 (Mar. 5, 2021), pp. 1-38.

* cited by examiner

FAST ANOMALY DETECTION METHOD AND SYSTEM BASED ON CONTRASTIVE REPRESENTATION DISTILLATION

CROSS-REFERENCE TO RELATED APPLICATIONS

This application is a continuation of International Application PCT/CN2021/135278, filed Dec. 3, 2021 and entitled "FAST ANOMALY DETECTION METHOD AND SYSTEM BASED ON CONTRASTIVE REPRESENTATION DISTILLATION", which is incorporated herein by reference in its entirety.

TECHNICAL FIELD

The present application relates to the field of artificial intelligence, and in particular, to a fast anomaly detection method and system based on contrastive representation distillation.

BACKGROUND ART

In the field of modern industrial manufacturing, industrial products may have some anomalies or defects due to processes and devices, and therefore, anomaly detection of industrial products is a key part of the quality detection of industrial products. This is very important for improving product processes and increasing a production line yield.

However, in conventional industrial manufacturing, anomaly detection of industrial products usually uses manual annotation of defects, which usually consumes a large number of manpower resources and may cause a risk of missed detection of unknown defective samples.

SUMMARY OF THE INVENTION

In view of the above problem, the present application provides a method and system for anomaly detection, so as to quickly detect defects without manual annotation of defects, significantly reduce detection costs, and greatly improve quality detection efficiency.

According to a first aspect, the present application provides a method for anomaly detection, the method including: acquiring a picture of an object to be detected; inputting the acquired picture to each of a trained teacher network and a student network distilled from the teacher network, to obtain a feature map output by the teacher network and a feature map output by the student network, where the teacher network is trained by constructing a defective sample to learn feature distribution of normal samples from a pretrained expert network; and determining a greatest anomalous pixel in a difference map between the feature map output by the teacher network and the feature map output by the student network as an anomaly value of the acquired picture, to output an anomaly detection result.

In the technical solution of this embodiment of the present application, a three-level network architecture, that is, an expert-teacher-student network architecture, is designed such that only normal image data needs to be used to train the network, thereby avoiding consuming a lot of time and manpower for image annotation, and a defective sample is constructed to obtain a more accurate feature space distribution of normal samples, which makes it more discriminative for hard negative samples and solves a problem of underfitting. In addition, using a knowledge distillation technology to compress a parameter of a network not only ensures a fast inference capability of the network, but also makes the network have strong robustness, thereby implementing fast visual detection of product anomalies.

In some embodiments, a feature map of each layer of the student network is distilled from a feature map of each corresponding layer of the teacher network, where the determining a greatest anomalous pixel in a difference map between the feature map output by the teacher network and the feature map output by the student network as an anomaly value of the acquired picture further includes: determining a greatest anomalous pixel in a total difference map between feature maps of layers with different resolutions that are output by the teacher network and feature maps of corresponding layers that are output by the student network as an anomaly value of the acquired picture, to output an anomaly detection result. During knowledge distillation, knowledge expressed by an intermediate layer of the teacher network is transferred by learning a feature map of the intermediate layer, so as to obtain a deeper network, better learn a generalization capability of the teacher network, and therefore implement more accurate anomaly detection.

In some embodiments, the defective sample is constructed through data augmentation. Constructing the defective sample through data augmentation avoids acquisition and annotation of an image of an anomalous product, and constructing a hard negative sample solves an underfitting problem.

In some embodiments, training of the teacher network includes the following steps, where a training data set includes a normal non-defective sample and a defective sample: inputting the normal non-defective sample to the pre-trained expert network and the teacher network, and minimizing, in a contrastive loss function, a distance between a feature vector of a last layer that is output by the expert network and a feature vector of a last layer that is output by the teacher network; inputting the normal non-defective sample to the pre-trained expert network and inputting the defective sample to the teacher network, and maximizing, in the contrastive loss function, a distance between a feature vector of a last layer that is output by the expert network and a feature vector of a last layer that is output by the teacher network; and updating a parameter of the teacher network based on loss calculation results. Thus, in a training process of the teacher network, a feature of a normal sample is first learned from the pre-trained expert network; a defective sample is constructed, and a distance between output features is maximized, to obtain a more compact feature space representation, which makes it more discriminative for hard negative samples.

In some embodiments, training of the student network includes the following steps, where a training data set includes a normal sample: inputting the normal sample to the trained teacher network and the student network to obtain a feature map of each layer that is output by the teacher network and a feature map of each corresponding layer that is output by the student network; minimizing, in a distillation loss function, a distance between the feature map of each layer that is output by the teacher network and the feature map of each corresponding layer that is output by the student network; and updating a parameter of the student network based on loss calculation results. Thus, in a training process of the student network, the student network distills a learned discriminative feature space from the teacher network, so that the student network can better learn a feature extraction capability of the expert network, thereby implementing more accurate anomaly detection.

In some embodiments, the outputting an anomaly detection result further includes: locating an anomalous region in the acquired picture based on the determined anomaly value to obtain a segmented anomalous region mask. Anomaly detection results are intuitively represented by locating and segmenting, based on an anomaly value, an anomalous region in a picture to be detected.

According to a second aspect, the present application provides a system for anomaly detection, the system including: an image acquisition module configured to acquire a picture of an object to be detected; a feature extraction module configured to input the acquired picture to each of a trained teacher network and a student network distilled from the teacher network, to obtain a feature map output by the teacher network and a feature map output by the student network, where the teacher network is trained by constructing a defective sample to learn feature distribution of normal samples from a pre-trained expert network; and an anomaly detection module configured to determine a greatest anomalous pixel in a difference map between the feature map output by the teacher network and the feature map output by the student network as an anomaly value of the acquired picture, to output an anomaly detection result.

In the technical solution of this embodiment of the present application, a three-level network architecture, that is, an expert-teacher-student network architecture, is designed such that only normal image data needs to be used to train the network, thereby avoiding consuming a lot of time and manpower for image annotation, and a defective sample is constructed to obtain a more accurate feature space distribution of normal samples, which makes it more discriminative for hard negative samples and solves a problem of underfitting. In addition, using a knowledge distillation technology to compress a parameter of a network not only ensures a fast inference capability of the network, but also makes the network have strong robustness, thereby implementing fast visual detection of product anomalies.

In some embodiments, a feature map of each layer of the student network is distilled from a feature map of each corresponding layer of the teacher network, where the anomaly detection module is further configured to: determine a greatest anomalous pixel in a total difference map between feature maps of layers with different resolutions that are output by the teacher network and feature maps of corresponding layers that are output by the student network as an anomaly value of the acquired picture, to output an anomaly detection result. During knowledge distillation, knowledge expressed by an intermediate layer of the teacher network is transferred by learning a feature map of the intermediate layer, so as to obtain a deeper network, better learn generalization of the teacher network, and therefore implement more accurate anomaly detection.

In some embodiments, the defective sample is constructed through data augmentation. Constructing the defective sample through data augmentation avoids acquisition and annotation of an image of an anomalous product, and constructing a hard negative sample solves an underfitting problem.

In some embodiments, training of the teacher network includes the following steps, where a training data set includes a normal non-defective sample and a defective sample: inputting the normal non-defective sample to the pre-trained expert network and the teacher network, and minimizing, in a contrastive loss function, a distance between a feature vector of a last layer that is output by the expert network and a feature vector of a last layer that is output by the teacher network; inputting the normal non-defective sample to the pre-trained expert network and inputting the defective sample to the teacher network, and maximizing, in the contrastive loss function, a distance between a feature vector of a last layer that is output by the expert network and a feature vector of a last layer that is output by the teacher network; and updating a parameter of the teacher network based on loss calculation results. Thus, in a training process of the teacher network, a feature of a normal sample is first learned from the pre-trained expert network; a defective sample is constructed, and a distance between output features is maximized, to obtain a more compact feature space representation, which makes it more discriminative for hard negative samples.

In some embodiments, training of the student network includes the following steps, where a training data set includes a normal sample: inputting the normal sample to the trained teacher network and the student network to obtain a feature map of each layer that is output by the teacher network and a feature map of each corresponding layer that is output by the student network; minimizing, in a distillation loss function, a distance between the feature map of each layer that is output by the teacher network and the feature map of each corresponding layer that is output by the student network; and updating a parameter of the student network based on loss calculation results. Thus, in a training process of the student network, the student network distills a learned discriminative feature space from the teacher network, so that the student network can better learn a feature extraction capability of the expert network, thereby implementing more accurate anomaly detection.

In some embodiments, the anomaly detection module is further configured to: locate an anomalous region in the acquired picture based on the determined anomaly value to obtain a segmented anomalous region mask. Anomaly detection results are intuitively represented by locating and segmenting, based on an anomaly value, an anomalous region in a picture to be detected.

According to a third aspect, the present application provides an apparatus for anomaly detection, the apparatus including: a memory storing computer-executable instructions; and at least one processor, where the computer-executable instructions, when executed by the at least one processor, cause the apparatus to implement a method according to any one of the above aspects.

In the technical solution of this embodiment of the present application, the apparatus uses an expert-teacher-student network architecture, and uses only normal image data to train the network, thereby avoiding consuming a lot of time and manpower for image annotation, and a defective sample is constructed to obtain a more compact feature space distribution of normal samples, which makes it more discriminative for hard negative samples and solves a problem of underfitting. In addition, using a knowledge distillation technology to compress a parameter of a network not only ensures a fast inference capability of the network, but also makes the network have strong robustness, thereby implementing fast visual detection of product anomalies.

The above description is only an overview of the technical solutions of the present application. In order to more clearly understand the technical means of the present application to implement same according to the contents of the specification, and in order to make the above and other objects, features, and advantages of the present application more obvious and understandable, specific embodiments of the present application are exemplarily described below.

BRIEF DESCRIPTION OF THE DRAWINGS

To understand in detail a manner used in the above features of the present application, a more detailed description of what has been briefly summarized above may be made with reference to various embodiments, some aspects of which are illustrated in the accompanying drawings. It is to be noted, however, that the accompanying drawings illustrate only some typical aspects of the present application and are therefore not to be considered limiting of the scope thereof, because the description may allow other equally effective aspects.

Figure 1:
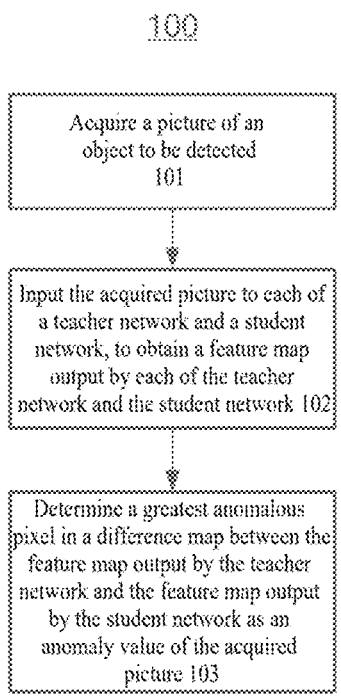
FIG. 1 is an example flowchart of a method for anomaly detection according to an embodiment of the present application.

REFERENCE NUMERALS IN THE EMBODIMENTS system for anomaly detection 700, image acquisition module 701, feature extraction module 702, anomaly detection module 703;

apparatus 800, memory 801, processor 802.

DETAILED DESCRIPTION OF EMBODIMENTS

Embodiments of the technical solutions of the present application will be described in more detail below with reference to the accompanying drawings. The following embodiments are merely intended to more clearly illustrate the technical solutions of the present application, so they merely serve as examples, but are not intended to limit the scope of protection of the present application.

Unless otherwise defined, all technical and scientific terms used herein have the same meanings as those commonly understood by those skilled in the art to which the present application belongs. The terms used herein are merely for the purpose of describing specific embodiments, but are not intended to limit the present application. The terms "including" and "having" and any variations thereof in the description and the claims of the present application as well as the brief description of the accompanying drawings described above are intended to cover non-exclusive inclusion.

In the description of the embodiments of the present application, the phrase "a plurality of" means two or more, unless otherwise explicitly and specifically defined. The phrase "embodiment" mentioned herein means that the specific features, structures, or characteristics described in conjunction with the embodiment can be encompassed in at least one embodiment of the present application. The phrase at various locations in the description does not necessarily refer to the same embodiment, or an independent or alternative embodiment exclusive of another embodiment. Those skilled in the art understand explicitly or implicitly that the embodiment described herein may be combined with another embodiment.

In the description of the embodiments of the present application, the term "and/or" is merely intended to describe the associated relationship of associated objects, indicating that three relationships can exist, for example, A and/or B can include: the three instances of A alone, A and B simultaneously, and B alone. In addition, the character "I" herein generally indicates an "or" relationship between the associated objects.

At present, from the perspective of the development of the market situation, the traction batteries are used more and more widely. The traction batteries are not only used in energy storage power systems such as hydroelectric power plants, thermal power plants, wind power plants and solar power plants, but also widely used in electric transportation means such as electric bicycles, electric motorcycles, and electric vehicles and in many fields such as military equipment and aerospace. With the continuous expansion of the application field of traction batteries, the market demand for the traction batteries is also expanding. Sealing pin welding is an essential link in a production process of traction batteries. Whether the sealing pin welding meets the standard directly affects the safety of the batteries. A sealing pin welding region is referred to as a weld bead. Due to changes in temperature, environment, and laser angle during welding, there are often defects such as burst lines (pseudo soldering) and melted beads on the weld bead.

Currently, with the development of machine vision and industrial automation, there are methods for automatic anomaly detection based on artificial intelligence. However, in a current deep learning-based visual detection method of industrial product defects, a large number of defective samples need to be acquired and defects need to be accurately annotated for the defective samples before the defective samples are used as a training data set for a network. In actual production, there will be a problem of a small number of defective samples. In addition, a data annotation process may also occupy a large amount of model development time, consuming a lot of time and manpower. Further, there are too many types of defects in actual products. A target detection network needs to accurately define types of defects, but in real scenarios, it is often impossible to accurately define all types of defects, resulting in a risk of missed detection of unknown defective samples, or an excessively large number of types of defects lead to an excessively large number of parameters of the model, and thus lead to an oversized model, which may affect deployment and robustness of the model. Furthermore, training a network using only a knowledge distillation-based method is also problematic because only normal samples are used and modeled during training. In this way, a learned feature space may have a problem of data underfitting, because in practical applications, there are various anomalous situations, and even some anomalous samples are very close to normal samples used for training.

In view of the above, in order to solve problems of a large amount of sample annotation, an oversized model, and underfitting in anomaly detection, the inventors have conducted in-depth research and designed a three-level network architecture based on contrastive representation distillation for fast anomaly detection. The present application uses only normal image data to train the network, thereby avoiding consuming a lot of time and manpower for image annotation, and a defective sample is constructed to prompt the network to correct feature space distribution of normal samples based on the hard negative samples, to obtain a more discriminative space distribution, thereby solving an underfitting problem. In addition, in the present application, using a knowledge distillation technology to compress a parameter of a network not only ensures a fast inference capability of the network, but also makes the network have strong robustness, thereby implementing fast visual detection of product anomalies. Compared with an inference speed of a previous algorithm, the network proposed in the present application needs only 5-10 ms to infer a picture. In addition, for unknown anomalous samples, the network proposed in the present application can still detect anomalous samples of unknown defect types.

It can be appreciated that the present application can be applied to the field of anomaly detection combined with artificial intelligence (AI), and the method and system for anomaly detection disclosed in the embodiments of the present application may be used, but not limited to, for anomaly detection of a sealing pin weld bead, and may be further used for anomaly detection of various other products in modern industrial manufacturing.

Figure 2:
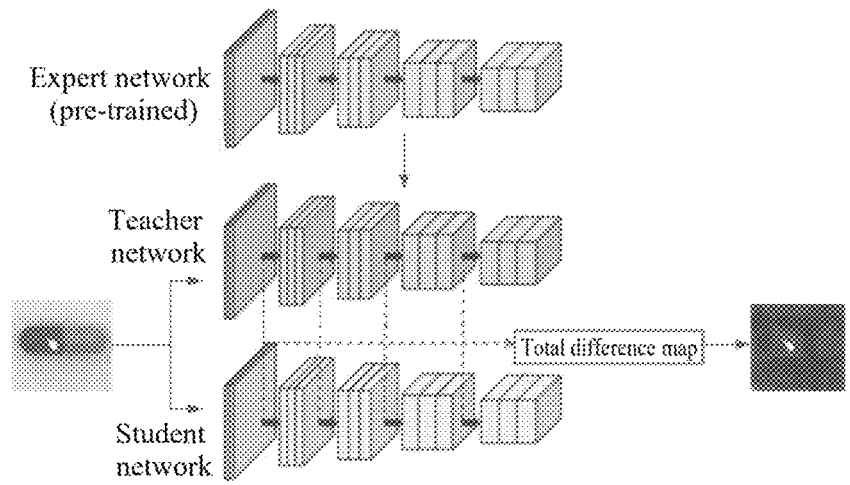
FIG. 2 is a schematic structural diagram of a three-level network architecture for anomaly detection according to an embodiment of the present application.

FIG. 1 is an example flowchart of a method 100 for anomaly detection according to an embodiment of the present application. According to an embodiment of the present application, refer to FIG. 1, and further refer to FIG. 2. FIG. 2 is a schematic structural diagram of a three-level network architecture for anomaly detection according to an embodiment of the present application. The method 100 starts at step 101 in which a picture of an object to be detected is acquired. In step 102, the acquired picture is input to each of a trained teacher network and a student network distilled from the teacher network, to obtain a feature map output by the teacher network and a feature map output by the student network, where the teacher network is trained by constructing a defective sample to learn feature distribution of normal samples from a pre-trained expert network. In step 103, a greatest anomalous pixel in a difference map between the feature map output by the teacher network and the feature map output by the student network is determined as an anomaly value of the acquired picture, to output an anomaly detection result.

As shown in FIG. 2, the teacher network in step 102 is a randomly initialized model, which learns feature distribution of normal samples from the pre-trained expert network by constructing defective samples, to obtain a more compact and accurate feature space representation. The pre-trained expert network may be a network model trained in advance, which has powerful feature extraction and image classification capabilities. For example, the pre-trained expert network may be AlexNet, VGG, GoogLeNet, ResNet, DenseNet, SENet, ShuteNet, or MobileNet. The student network in step 102 is a randomly initialized model that is distilled from the trained teacher network. Knowledge distillation uses a teacher-student model, and a complex and large network is used as the teacher network, while the student network has a relatively simple structure. The teacher network is used to assist in training of the student network. Due to a strong learning capability of the teacher network, it can transfer its learned knowledge to the student network with a weaker learning capability, to enhance a generalization capability of the student network. After the acquired picture to be detected is input to the teacher network and the student network, the feature map output by the teacher network and the feature map output by the student network can be obtained. Because the teacher network only teaches capabilities of performing feature extraction and image classification on normal images to the student network, the student network does not have knowledge of an anomalous input, while the teacher network has knowledge of an anomalous input, which leads to an underlying difference in behavior of the two networks in a case of an anomalous input. Thus, this difference can be defined and quantified by the difference map between the feature maps output by the two networks, that is, the greatest anomalous pixel in the difference map is determined as the anomaly value of the acquired picture, and used as an anomaly detection indicator to locate anomalies in the picture, thereby implement pixel-level anomaly detection of product images.

Thus, an expert-teacher-student network architecture is constructed, such that more compact feature distribution of normal samples may be first learned from the expert network through contrastive representation, thereby avoiding difficulty in acquisition and annotation of images of anomalous products in a conventional method, saving a lot of manpower and material resources, and solving a problem of underfitting, then knowledge distillation is used to obtain a high-quality student network through training, to transfer feature extraction and classification capabilities, and a degree of an anomaly is defined and quantified through a difference between feature maps, thereby implementing pixel-level fast anomaly detection on product images.

According to an embodiment of the present application, optionally, still refer to FIG. 2. A feature map of each layer of the student network is distilled from a feature map of each corresponding layer of the teacher network, where the determining a greatest anomalous pixel in a difference map between the feature map output by the teacher network and the feature map output by the student network as an anomaly value of the acquired picture further includes: determining a greatest anomalous pixel in a total difference map between feature maps of layers with different resolutions that are output by the teacher network and feature maps of corresponding layers that are output by the student network as an anomaly value of the acquired picture, to output an anomaly detection result.

As can be seen in FIG. 2, the student network not only learns resulting knowledge of the teacher network, but also learns intermediate layer features in the structure of the teacher network. Specifically, the student network fits a soft target of the teacher network, and also fits outputs of intermediate layers with different resolutions (features extracted by the teacher network), thereby making the student network deeper. Thus, as shown in FIG. 2, in an inference stage after the training is completed, the acquired picture to be detected may be input to each of the teacher network and the student network obtained through feature distillation from the teacher network, to output four feature maps of different layers respectively, and then the sum of mean squared errors of the feature maps of the layers output by the two networks is used as the total difference map, that is, an anomaly value distribution map of the network. The greatest anomalous pixel in the total difference map is defined as the anomaly value of the picture to be detected, and used as an anomaly detection indicator.

Thus, during knowledge distillation, knowledge expressed by an intermediate layer of the teacher network is transferred by learning a feature map of the intermediate layer, so as to obtain a deeper network while compressing the model, better learn a generalization capability of the teacher network, and implement a capability to perform fast anomaly detection with a small number of network parameters. In addition, a degree of an anomaly is defined and quantified through the difference between the feature maps of the layers, thereby implementing pixel-level anomaly detection on product images.

Figure 4:
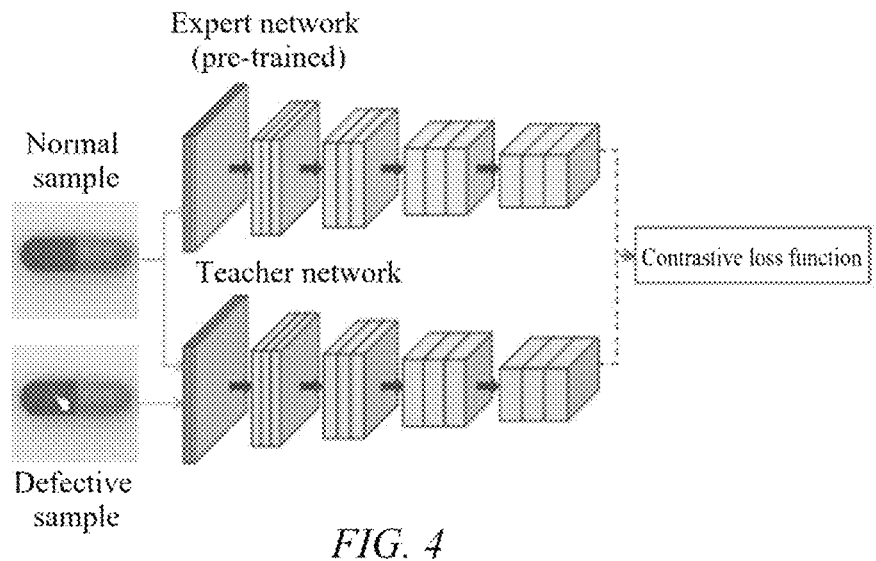
FIG. 4 is a schematic diagram of a method for training a teacher network according to an embodiment of the present application.

According to an embodiment of the present application, optionally, refer to FIG. 4. FIG. 4 is a schematic diagram of a method for training a teacher network according to an embodiment of the present application, where the defective sample may be constructed through data augmentation.

When the teacher network is training, the defective sample may be constructed through data augmentation, and a method of contrastive representation may be used to learn more compact feature distribution of normal samples from the pre-trained expert network.

Methods for data enhancement include, for example, Cutout, Random Erasing, and GridMask. For example, a defective image may be constructed by randomly selecting a region in a normal image and setting a pixel value of the region to 0 or another uniform value.

Constructing the defective sample through data augmentation avoids acquisition and annotation of an image of an anomalous product, and constructing a hard negative sample solves an underfitting problem, to obtain a more discriminative feature space representation.

Figure 3:
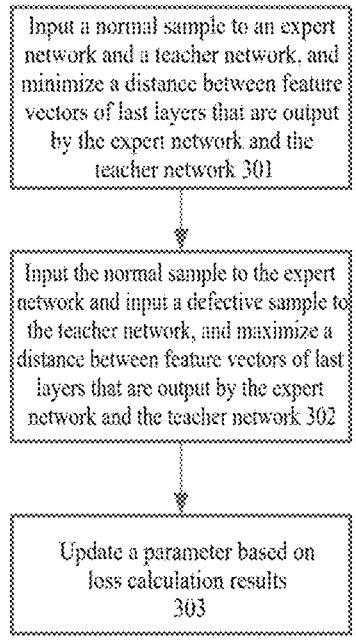
FIG. 3 is an example flowchart of a method for training a teacher network according to an embodiment of the present application.

According to an embodiment of the present application, optionally, refer to FIG. 3 and FIG. 4. FIG. 3 is an example flowchart of a method 300 for training a teacher network according to an embodiment of the present application, where a training data set includes a normal non-defective sample and a defective sample. The method 300 starts at step 301 in which the normal non-defective sample is input to the pre-trained expert network and the teacher network, and a distance between a feature vector of a last layer that is output by the expert network and a feature vector of a last layer that is output by the teacher network is minimized in a contrastive loss function. In step 302, the normal non-defective sample is input to the pre-trained expert network and the defective sample is input to the teacher network, and a distance between a feature vector of a last layer that is output by the expert network and a feature vector of a last layer that is output by the teacher network is maximized in the contrastive loss function. In step 303, a parameter of the teacher network is updated based on loss calculation results. Then, the steps of the method 300 are repeated, and continuous iterative optimization is performed until convergence.

As shown in FIG. 4, when the teacher network is trained, a normal image (namely, a positive sample) is first input to the pre-trained expert network and the teacher network, the feature vectors are output from the last layers of the two networks respectively, and the distance (for example, a Euclidean distance) between the feature vectors of the last layers of the expert network and the teacher network for the positive sample is minimized in the contrastive loss function, so that the teacher network learns feature distribution of normal samples from the expert network. Then, a defective image (namely, a negative sample) constructed, for example, through data augmentation, is input to the teacher network, a normal sample is input to the expert network, the feature vectors are output from the last layers of the two networks respectively, and the distance between the feature vectors of the last layers of the expert network and the teacher network is maximized in the contrastive loss function, so that the teacher network may better learn distribution of normal samples in a feature space through the constructed negative sample, and the teacher network may obtain more compact feature space representation. The contrastive loss function used in the training is a loss function with a self-discovery property of hard negative samples. This property is crucial for learning high-quality self-supervised representations. The effect of focusing on hard negative samples is that there is no need to make already discrete samples more discrete, but the main focus is on how to enable those samples that are not discrete to be discrete, so that a resulting feature space is more uniform and compact.

Thus, the teacher network is trained through contrastive representation, and a defective sample is constructed, so that the teacher network may obtain a more compact feature space representation, which makes it more discriminative for hard negative samples.

Figure 5:
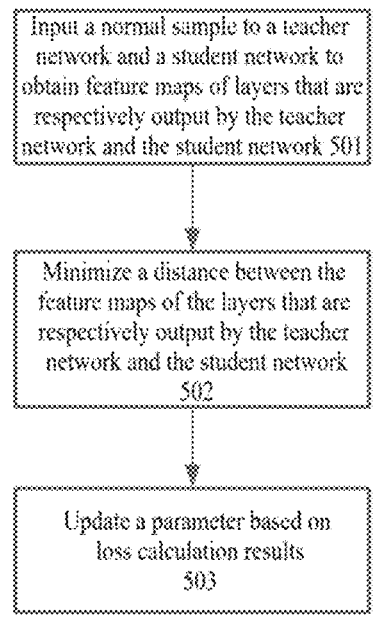
FIG. 5 is an example flowchart of a method for training a student network according to an embodiment of the present application.
Figure 6:
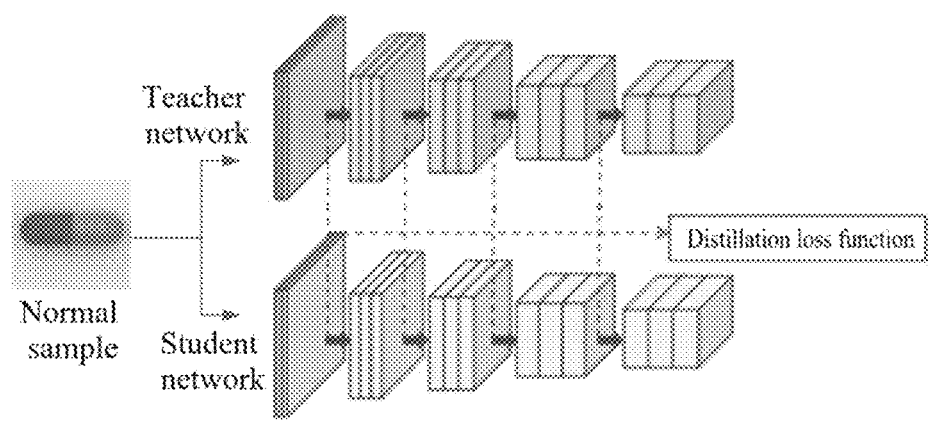
FIG. 6 is a schematic diagram of a method for training a student network according to an embodiment of the present application.

According to an embodiment of the present application, optionally, refer to FIG. and FIG. 6. FIG. 5 is an example flowchart of a method 500 for training a student network according to an embodiment of the present application, where a training data set includes a normal sample; and FIG. 6 is a schematic diagram of a method for training a student network according to an embodiment of the present application. The method 500 starts at step 501 in which the normal sample is input to the trained teacher network and the student network to obtain a feature map of each layer that is output by the teacher network and a feature map of each corresponding layer that is output by the student network. In step 502, a distance between the feature map of each layer that is output by the teacher network and the feature map of each corresponding layer that is output by the student network is minimized in a distillation loss function. In step 503, a parameter of the student network is updated based on loss calculation results. Then, the steps of the method 500 are repeated, and continuous iterative optimization is performed until convergence.

As shown in FIG. 6, when the student network is trained, a normal image is input to the trained teacher network and the student network. Four feature maps of different layers are taken from the two networks, where the four feature maps have different resolutions, and a student distillation loss function (for example, L2 loss function) is designed to minimize a distance between the layers in the two networks. For example, during a first stage, an intermediate layer is trained first, and because output sizes of the layers of the two networks may be different, an additional convolutional layer needs to be added to match the output sizes of the layers of the two networks. Then, an intermediate layer of the student network is trained through knowledge distillation, so that the intermediate layer of the student network learns an output of a hidden layer of the teacher network, that is, training of the student network is guided based on loss of the teacher network, so that a distance between the layers of the two networks is the smallest (for example, an MSE is the smallest). During a second stage, after the intermediate layer of the student network is trained, a current parameter is used as an initialization parameter of the student network, and parameters of all layers of the student network are trained through knowledge distillation, so that the student network learns an output of the teacher network.

Thus, in the training process of the student network, the student network distills a learned discriminative feature space from the teacher network, so that the student network can better learn feature extraction and image classification capabilities of the expert network, and through model compression, the network has a capability to detect anomalies with a small number of network parameters. In addition, the network has a simple structure, which makes it easy to deploy the network and implement fast detection. In addition, by learning normal sample images instead of defective samples, the network has a capability to identify and detect defects that a conventional detection method does not have. The network can still detect samples with unknown defect types correctly, thereby avoiding missed detection of unknown defect types, and has strong robustness.

According to an embodiment of the present application, optionally, still refer to FIG. 2, the outputting an anomaly detection result further includes: locating an anomalous region in the acquired picture based on the determined anomaly value to obtain a segmented anomalous region mask.

Thus, anomaly detection results are intuitively represented by locating and segmenting, based on an anomaly value, an anomalous region in a picture to be detected.

Figure 7:
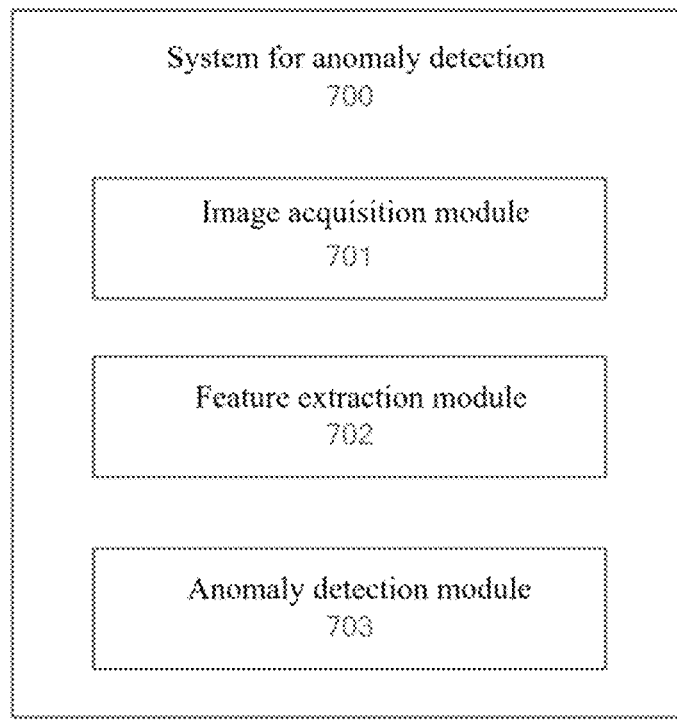
FIG. 7 is a schematic diagram of an architecture of a system for anomaly detection according to an embodiment of the present application.

FIG. 7 is a schematic diagram of an architecture of a system 700 for anomaly detection according to an embodiment of the present application. According to an embodiment of the present application, referring to FIG. 7, the system 700 includes at least an image acquisition module 701, a feature extraction module 702, and an anomaly detection module 703. The image acquisition module 701 may be configured to acquire a picture of an object to be detected. The feature extraction module 702 may be configured to input the acquired picture to each of a trained teacher network and a student network distilled from the teacher network, to obtain a feature map output by the teacher network and a feature map output by the student network, where the teacher network is trained by constructing a defective sample to learn feature distribution of normal samples from a pre-trained expert network. The anomaly detection module 703 may be configured to determine a greatest anomalous pixel in a difference map between the feature map output by the teacher network and the feature map output by the student network as an anomaly value of the acquired picture, to output an anomaly detection result.

Corresponding to the above method 100 for anomaly detection, the system for anomaly detection according to the present application constructs a three-level expert-teacher-student network architecture, such that more compact feature distribution of normal samples may be first learned from the expert network through contrastive representation, thereby avoiding difficulty in acquisition and annotation of images of anomalous products in a conventional method, saving a lot of manpower and material resources, and solving a problem of underfitting, and then knowledge distillation is used to obtain a high-quality student network through training. By learning normal sample images instead of defective samples, the network can correctly detect unknown defects, thereby avoiding missed detection of unknown defect types, and has strong robustness. In addition, a degree of an anomaly is defined and quantified through a difference between feature maps, thereby implementing pixel-level fast anomaly detection on product images.

According to an embodiment of the present application, optionally, a feature map of each layer of the student network is distilled from a feature map of each corresponding layer of the teacher network, where the anomaly detection module may be further configured to determine a greatest anomalous pixel in a total difference map between feature maps of layers with different resolutions that are output by the teacher network and feature maps of corresponding layers that are output by the student network as an anomaly value of the acquired picture, to output an anomaly detection result.

Thus, a deeper network may be obtained through feature distillation, a generalization capability of the teacher network is better learned, and a capability to perform fast anomaly detection with a small number of network parameters is implemented. In addition, a degree of an anomaly is defined and quantified through the difference between the feature maps of the layers, thereby implementing pixel-level anomaly detection on product images.

Those skilled in the art can understand that the system and its modules of the present disclosure may be implemented in hardware or software, and the modules may be merged or combined in any suitable manner.

Figure 8:
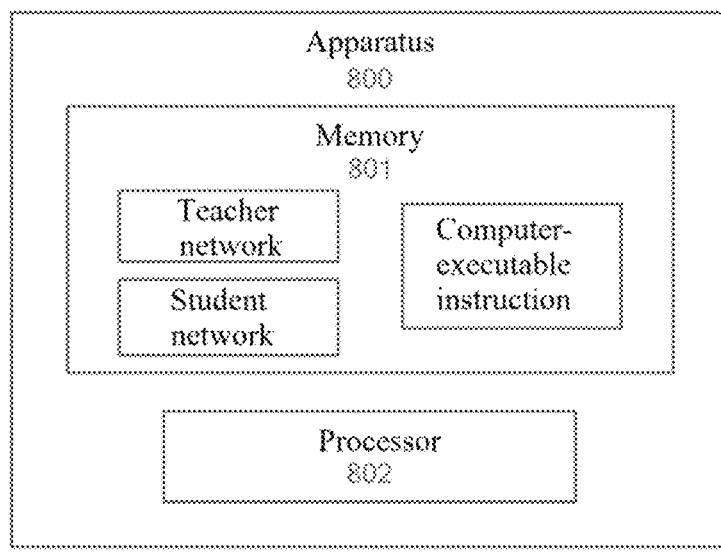
FIG. 8 is a schematic diagram of an architecture of an apparatus for anomaly detection according to another embodiment of the present application.

FIG. 8 is a schematic diagram of an architecture of an apparatus 800 for anomaly detection according to another embodiment of the present application. According to an embodiment of the present application, referring to FIG. 8, the apparatus 800 may include a memory 801 and at least one processor 802. The memory 801 may store computer-executable instructions. The memory 801 may further store a trained teacher network and a student network distilled from the teacher network, where the teacher network is trained by constructing a defective sample to learn feature distribution of normal samples from a pre-trained expert network. The computer-executable instructions, when executed by the at least one processor 802, cause the apparatus 800 to perform the following operations: acquiring a picture of an object to be detected; inputting the acquired picture to a trained teacher network and a student network distilled from the teacher network, to obtain a feature map output by the teacher network and a feature map output by the student network; and determining a greatest anomalous pixel in a difference map between the feature map output by the teacher network and the feature map output by the student network as an anomaly value of the acquired picture, to output an anomaly detection result.

The memory 801 may include a RAM, a ROM, or a combination thereof. In some cases, the memory 801 may include, in particular, a basic input/output system (BIOS) that may control basic hardware or software operations, such as interaction with peripheral components or devices. The processor 802 may include an intelligent hardware device (for example, a general-purpose processor, a digital signal processor (DSP), a central processing unit (CPU), a microcontroller, an application-specific integrated circuit (ASIC), a field programmable gate array (FPGA), a programmable logic device, a discrete gate or transistor logic component, a discrete hardware component, or any combination thereof).

Thus, corresponding to the above method 100 for anomaly detection, the apparatus for anomaly detection according to the present application uses a three-level expert-teacher-student network architecture, such that more compact feature distribution of normal samples may be learned, thereby avoiding difficulty in acquisition and annotation of images of anomalous products in a conventional method, saving a lot of manpower and material resources, and solving a problem of underfitting. By learning normal sample images instead of defective samples, the network can correctly detect unknown defects, thereby avoiding missed detection of unknown defect types, and has strong robustness. In addition, a degree of an anomaly is defined and quantified through a difference between feature maps, thereby implementing pixel-level fast anomaly detection on product images. Herein, the computer-executable instructions, when executed by the at least one processor 802, cause the apparatus 800 to perform various operations described above with reference to FIG. 1 to FIG. 6. Details are not described herein again for the sake of brevity.

The various illustrative blocks and modules described in connection with the disclosure herein can be implemented or performed with a general-purpose processor, a DSP, an ASIC, an FPGA, or another programmable logic device, discrete gate, or transistor logic, a discrete hardware component, or any combination thereof, that is designed to perform functions described herein. The general-purpose processor may be a microprocessor, but in an alternative, the processor may be any conventional processor, controller, microcontroller, or state machine. The processor may be alternatively implemented as a combination of computing devices (for example, a combination of a DSP and a microprocessor, a plurality of microprocessors, one or more microprocessors in conjunction with a DSP core, or any other such configurations).

The functions described herein may be implemented in hardware, software executed by a processor, firmware, or any combination thereof. If implemented in software executed by a processor, the functions may be stored on or transmitted over a computer-readable medium as one or more instructions or codes. Other examples and implementations are within the scope of the present disclosure and the appended claims. For example, due to the nature of software, the functions described herein may be implemented by using software executed by a processor, hardware, firmware, hardwiring, or any combination thereof. Features implementing the functions may also be physically located at various locations, including being distributed such that portions of the functions are implemented at different physical locations.

While the present application has been described with reference to the preferred embodiments, various modifications can be made, and equivalents can be provided to substitute for the components thereof without departing from the scope of the present application. In particular, the technical features mentioned in the embodiments can be combined in any manner, provided that there is no structural conflict. The present application is not limited to the specific embodiments disclosed herein but includes all the technical solutions that fall within the scope of the claims.

The invention claimed is:

1. A method for anomaly detection, the method comprising:
   acquiring a picture of an object to be detected;
   inputting the acquired picture to each of a trained teacher network and a student network distilled from the teacher network, to obtain a feature map output by the teacher network and a feature map output by the student network, wherein the teacher network is trained by constructing a defective sample to learn feature distribution of normal samples from a pre-trained expert network; and
   determining a pixel based on a difference map between the feature map output by the teacher network and the feature map output by the student network as an anomaly detection indicator for the acquired picture and for outputting an anomaly detection result, wherein the determination comprises identifying the pixel by virtue of the pixel having a greatest difference value in layers of the feature map output by the teacher network and in the corresponding layers of the feature map output by the student network.

2. The method of claim 1, wherein the determining the pixel in the difference map between the feature map output by the teacher network and the feature map output by the student network as an anomaly indicator for the acquired picture further comprises:
   determining the pixel in a total difference map between feature maps of layers with different resolutions that are output by the teacher network and feature maps of corresponding layers that are output by the student network as an anomaly value of the acquired picture, to output the anomaly detection result.

3. The method of claim 1, characterized in that the defective sample is constructed through data augmentation.

4. The method of claim 1, characterized in that training of the teacher network comprises the following steps, wherein a training data set comprises a normal non-defective sample and a defective sample:
   inputting the normal non-defective sample to the pre-trained expert network and the teacher network, and minimizing, in a contrastive loss function, a distance between a feature vector of a last layer that is output by the expert network and a feature vector of a last layer that is output by the teacher network;
   inputting the normal non-defective sample to the pre-trained expert network and inputting the defective sample to the teacher network, and maximizing, in the contrastive loss function, a distance between a feature vector of a last layer that is output by the expert network and a feature vector of a last layer that is output by the teacher network; and
   updating a parameter of the teacher network based on loss calculation results.

5. The method of claim 1, characterized in that training of the student network comprises the following steps, wherein a training data set comprises a normal sample:
   inputting the normal sample to the trained teacher network and the student network to obtain a feature map of each layer that is output by the teacher network and a feature map of each corresponding layer that is output by the student network;
   minimizing, in a distillation loss function, a distance between the feature map of each layer that is output by the teacher network and the feature map of each corresponding layer that is output by the student network; and
   updating a parameter of the student network based on loss calculation results.

6. The method of claim 1, characterized in that the outputting an anomaly detection result further comprises:
   locating an anomalous region in the acquired picture based on the determined anomaly value to obtain a segmented anomalous region mask.

7. A system for anomaly detection, the system comprising a processor configured to implement computer software modules comprising:
   an image acquisition module configured to acquire a picture of an object to be detected;
   a feature extraction module configured to input the acquired picture to each of a trained teacher network and a student network distilled from the teacher network, to obtain a feature map output by the teacher network and a feature map output by the student network, wherein the teacher network is trained by constructing a defective sample to learn feature distribution of normal samples from a pre-trained expert network; and
   an anomaly detection module configured to determine a pixel based on a difference map between the feature map output by the teacher network and the feature map output by the student network as an anomaly detection indicator for the acquired picture the acquired picture and for outputting an anomaly detection result, wherein the determination comprises identifying the pixel by virtue of the pixel having a greatest difference value in layers of the feature map output by the teacher network and in corresponding layers of the feature map output by the student network.

8. The system of claim 7, wherein the anomaly detection module is further configured to:
determine the pixel in a total difference map between feature maps of layers with different resolutions that are output by the teacher network and feature maps of corresponding layers that are output by the student network as an anomaly value of the acquired picture, to output the anomaly detection result.

9. The system of claim 7, characterized in that the defective sample is constructed through data augmentation.

10. The system of claim 7, characterized in that training of the teacher network comprises the following steps, wherein a training data set comprises a normal non-defective sample and a defective sample:
inputting the normal non-defective sample to the pre-trained expert network and the teacher network, and minimizing, in a contrastive loss function, a distance between a feature vector of a last layer that is output by the expert network and a feature vector of a last layer that is output by the teacher network;
inputting the normal non-defective sample to the pre-trained expert network and inputting the defective sample to the teacher network, and maximizing, in the contrastive loss function, a distance between a feature vector of a last layer that is output by the expert network and a feature vector of a last layer that is output by the teacher network; and
updating a parameter of the teacher network based on loss calculation results.

11. The system of claim 7, characterized in that training of the student network comprises the following steps, wherein a training data set comprises a normal sample:
inputting the normal sample to the trained teacher network and the student network to obtain a feature map of each layer that is output by the teacher network and a feature map of each corresponding layer that is output by the student network;
minimizing, in a distillation loss function, a distance between the feature map of each layer that is output by the teacher network and the feature map of each corresponding layer that is output by the student network; and
updating a parameter of the student network based on loss calculation results.

12. The system of claim 7, characterized in that the anomaly detection module is further configured to:
locate an anomalous region in the acquired picture based on the determined anomaly value to obtain a segmented anomalous region mask.

13. An apparatus for anomaly detection, the apparatus comprising:
a memory storing computer-executable instructions; and
at least one processor, wherein the computer-executable instructions, when executed by the at least one processor, cause the apparatus to implement a method of claim 1.

* * * * *